United States Patent [19]

Stookey

[11] Patent Number: 5,296,217

[45] Date of Patent: Mar. 22, 1994

[54] METHODS FOR PREVENTING DENTAL CALCULUS IN DOMESTIC ANIMALS

[75] Inventor: George K. Stookey, Noblesville, Ind.

[73] Assignee: Indiana University Foundation, Bloomington, Ind.

[21] Appl. No.: 898,290

[22] Filed: Jun. 15, 1992

[51] Int. Cl.$^5$ .................. A61K 7/16; A61K 33/42; A61K 47/00

[52] U.S. Cl. ........................ 424/57; 424/401; 424/439; 424/440; 424/441; 424/442; 426/805; 426/807; 426/89; 426/92; 426/96; 426/97; 426/98; 426/302; 426/574; 426/635

[58] Field of Search ................ 424/57, 401, 439, 440, 424/441, 442

[56] References Cited

U.S. PATENT DOCUMENTS

| | | | |
|---|---|---|---|
| 2,191,199 | 2/1940 | Hall | 424/57 |
| 3,004,897 | 10/1961 | Shore | 424/54 |
| 3,475,533 | 10/1969 | Mayrand | 424/57 |
| 3,620,767 | 11/1971 | Swartz | 426/643 |
| 4,011,346 | 3/1977 | Ernst | 426/104 |
| 4,044,158 | 8/1977 | Burkwall, Jr. | 426/271 |
| 4,297,382 | 10/1981 | Hosaka | 426/656 |
| 4,324,811 | 4/1982 | Eugley | 426/566 |
| 4,357,318 | 11/1982 | Shah et al. | 424/52 |
| 4,444,800 | 4/1984 | Bixby et al. | 426/582 |
| 4,460,565 | 7/1984 | Westrate et al. | 424/57 |
| 4,603,054 | 7/1986 | Schmidt et al. | 426/646 |
| 4,627,977 | 12/1986 | Gaffar et al. | 424/52 |
| 4,784,862 | 11/1988 | Wotherspoon | 426/805 |
| 4,806,342 | 2/1989 | Gaffar et al. | 424/52 |
| 4,808,400 | 2/1989 | Gaffar et al. | 424/52 |
| 4,808,401 | 2/1989 | Gaffar et al. | 424/52 |
| 4,913,895 | 4/1990 | Miyake et al. | 424/52 |
| 4,915,937 | 4/1990 | Amjad | 424/52 |
| 4,921,692 | 5/1990 | Gaffar et al. | 424/52 |
| 4,921,693 | 5/1990 | Gaffar et al. | 424/52 |
| 5,000,940 | 3/1991 | Staples et al. | 424/49 |
| 5,000,943 | 3/1991 | Scaglione et al. | 424/57 |
| 5,000,944 | 3/1991 | Prencipe et al. | 424/57 |
| 5,000,973 | 3/1991 | Scaglione et al. | 426/549 |
| 5,006,361 | 4/1991 | Cox | 426/807 |
| 5,011,679 | 4/1991 | Spanier et al. | 424/57 |
| 5,015,485 | 5/1991 | Scaglione et al. | 426/94 |
| 5,017,362 | 5/1991 | Gaffar et al. | 424/52 |
| 5,037,637 | 8/1991 | Gaffar et al. | 424/52 |
| 5,043,154 | 8/1991 | Gaffar et al. | 424/52 |
| 5,047,231 | 9/1991 | Spanier et al. | 424/57 |
| 5,094,870 | 3/1992 | Scaglione et al. | 426/549 |
| 5,114,704 | 5/1992 | Spanier et al. | 426/805 |

FOREIGN PATENT DOCUMENTS

| | | | |
|---|---|---|---|
| 1223866 | 7/1987 | Canada | 424/57 |
| 130689 | 1/1985 | European Pat. Off. | 424/57 |
| 2602981 | 7/1977 | Fed. Rep. of Germany | 424/57 |
| 7600503 | 1/1976 | Netherlands | 424/57 |
| 1143399 | 2/1969 | United Kingdom | 424/57 |
| 2170092 | 7/1986 | United Kingdom | 424/57 |

OTHER PUBLICATIONS

M. D. Francis and W. W. Briner, "Animal Calculus: Methods of Evaluation and of Dietary Production and Control," *J. Dent. Res.* 48, 1185–1195 (1969).

M. D. Francis, "The Inhibition of Calcium Hydroxyapatite Crystal Growth by Polyphosphonates and Polyphosphates," *Calc. Tiss. Res.* 3, 151–162 (1969).

(List continued on next page.)

*Primary Examiner*—Shep K. Rose
*Attorney, Agent, or Firm*—Woodard, Emhardt, Naughton, Moriarty & McNett

[57] ABSTRACT

The novel agents for preventing dental calculus in domestic animals of the present invention are sequestering agents that are applied as coatings to commercially-prepared diets for domestic animals and that are significantly superior in terms of their anticalculus efficacy to the soluble pyrophosphate crystal growth inhibitors of the prior art. The sequestering agents of the present invention form soluble calcium complexes in saliva and dental plaque fluids thereby preventing the calcification of dental plaque. Sodium hexametaphosphate has been utilized as the preferred sequestering agents of the invention to date.

7 Claims, No Drawings

OTHER PUBLICATIONS

F. J. Draus, M. Lesniewski and F. L. Miklos, "Pyrophosphate and Hexametaphosphate Effects in In Vitro Calculus Formation," *Archs. Oral Biol.* 15, 893–896 (1970).

W. W. Briner, M. D. Francis and J. S. Widder, "The Control of Dental Calculus in Experimental Animals," *The International Dental Journal* 21, 61–73 (1971).

G. P. Barnes, G. K. Stookey and J. C. Muhler, "In Vitro Studies of the Calculus-Inhibiting Properties of Tooth Surface Polishing Agents and Chelating Agents," *J. Dent. Res.* 50(4), 966–975 (1971).

M. D. Francis and W. W. Briner, "The Effect of Phosphonates on Dental Enamel In Vitro and Calculus Formation In Vivo," *Calc. Tiss. Res.* 11, 1–9 (1973).

W. W. Briner and M. D. Francis, "In Vitro and In Vivo Evaluation of Anti-Calculus Agents," *Calc. Tiss. Res.* 11, 10–22 (1973).

G. K. Stookey and J. L. McDonald, Jr., "Chemical Prevention of Calculus Formation in the Rat," *J. Dent. Res.* 53(6), 1334–1337 (1974).

D. J. White, W. D. Bowman, E. Cox, M. Best, C. A. Rodlun, J. M. Warrick and G. K. Stookey, "In Vitro and In Vivo Studies of Anticalculus Agents," *J. Dent. Res.* 68, Special Issue, Abstracts of Papers 1586, 380 (1989).

G. K. Stookey and J. M. Warrick, "Additivity of Antimicrobial Agents and Crystal Growth Inhibitors for Calculus Prevention in an Animal Model," *Caries Research* 24, Abstracts 6, 398 (1990).

F. J. Draus, W. J. Tarbet and F. L. Miklos, "Salivary Enzymes and Calculus Formation," *J. Periodont. Res.* 3, 232–235 (1968).

METHODS FOR PREVENTING DENTAL CALCULUS IN DOMESTIC ANIMALS

BACKGROUND OF THE INVENTION

This invention relates generally to agents for the prevention of dental calculus, commonly called tartar, that are added to commercially-prepared diets for domestic animals, and more particularly to novel agents for the prevention of dental calculus in domestic animals that are added as a coating to commercially-prepared diets for domestic animals, especially dogs and cats, and that produce significantly superior results.

Dental calculus, or tartar, is recognized as a recurring calcified deposit on the surfaces of the teeth of domestic animals, including dogs and cats, as well as humans. It is generally recognized that dental calculus develops in a sequential process that involves the accumulation of dental plaque and the subsequent calcification of the plaque by saliva, which has very high concentrations of calcium and phosphate. Although calculus, per se, is not directly responsible for the development of oral diseases, it is recognized as a secondary, or contributing, factor in the development of periodontal disease because: (1) its presence on the teeth serves as a local irritant to the adjacent soft tissues, eliciting an inflammatory response (and soft tissue inflammation is the initial phase of periodontal disease); (2) it interferes with the normal cleansing of the tooth surfaces, which occurs during the mastication of food or through the performance of conventional oral hygiene procedures, such as toothbrushing and flossing; and (3) it harbors bacterial toxins, which exacerbate periodontal disease formation, by virtue of its porosity. Once formed, calculus deposits can only be removed through concerted mechanical procedures, i.e., a dental prophylaxis. Thus, the prevention of dental calculus is of importance not only for cosmetic reasons, but also because of dental calculus' secondary role in the development of periodontal disease, and the resultant systemic infections, alveolar bone recession, tooth loss and adverse mouth/breath odors.

At present, the recognized approaches for the prevention of dental calculus formation are: (1) the meticulous, daily removal of dental plaque prior to its calcification; and (2) the daily application of crystal growth inhibitors that interfere with the calcification of dental plaque by saliva. Known crystal growth inhibitors include various soluble pyrophosphates, sodium tripolyphosphate, soluble diphosphonates, and certain soluble zinc compounds, such as zinc chloride. These crystal growth inhibitors are currently being used in dentifrices and mouthwashes for preventing dental calculus formation in humans. Soluble pyrophosphates are also currently being cooked or baked in the dough of commercially-prepared diets for dogs and cats for the stated purpose of preventing dental calculus formation in these domestic animals.

SUMMARY OF THE INVENTION

The novel agent(s) for preventing dental calculus in domestic animals of the present invention are sequestrants, or sequestering agents, in contrast to the crystal growth inhibitors of the prior art, that are applied as coatings to commercially-prepared diets for domestic animals, and which, in testing completed to date, have proven to be significantly superior in terms of their anticalculus efficacy to the soluble pyrophosphate crystal growth inhibitors of the prior art. The sequestering agents of the present invention form soluble calcium complexes with the calcium in saliva and dental plaque fluids thereby preventing the usual calcification of dental plaque on the surfaces of teeth. Numerous compounds classified as sequestering agents are used in industry to form soluble coordination complexes with various cations, thereby preventing their usual precipitation as insoluble deposits. Although the present invention describes the use of a preferred sequestrant, sodium hexametaphosphate, it is probable that other organic sequestering agents, such as the hydroxycarboxylic acids, including citric acid, fumaric acid, glutaric acid, acetic acid, oxalic acid, and the like, and their alkali salts, such as sodium citrate, potassium citrate, etc., as well as their aminopolycarboxylic acid derivatives, for example, ethylenediaminetetraacetic acid, may be similarly used in the manner disclosed herein.

Sodium hexametaphosphate has been utilized as the preferred sequestering agent of the invention in testing completed to date for a variety of reasons, including: (1) its biological/toxicological/pharmacological safety for ingestion by animals, as evidenced by its acceptance as GRAS by the U.S. Food and Drug Administration; (2) its efficacy for calculus prevention when utilized at relatively low concentrations; (3) its markedly superior efficacy for calculus prevention as compared to the most commonly-used crystal growth inhibitor of the prior art, i.e., soluble pyrophosphate; and (4) its ease of use as a coating for pet foods without appreciably altering the organoleptic and palatability characteristics of the basal diet.

One embodiment of the present invention is a domestic animal food composition having dental calculus prevention efficacy, comprising a dry domestic animal food composition having a surface coating that contains an effective amount of a sequestering agent that forms soluble calcium complexes in saliva and dental plaque fluids to prevent the calcification of dental plaque.

Another embodiment of the present invention is a domestic animal food composition having dental calculus prevention efficacy, comprising a dry domestic animal food composition including an effective amount of a sequestering agent that forms soluble calcium complexes in saliva and dental plaque fluids to prevent the calcification of dental plaque.

Yet another embodiment of the present invention is a method for preventing dental calculus in domestic animals, comprising coating a dry domestic animal food composition with an effective amount of a sequestering agent that forms soluble calcium complexes in saliva and dental plaque fluids to prevent the calcification of dental plaque.

Yet another embodiment of the present invention is a method for preventing dental calculus in domestic animals, comprising admixing a moist domestic animal food composition with an effective amount of a sequestering agent that forms soluble calcium complexes in saliva and dental plaque fluids to prevent the calcification of dental plaque.

Related objects and advantages of the present invention will be evident from the following description.

DESCRIPTION OF THE PREFERRED EMBODIMENTS

For the purposes of promoting a better understanding of the principles of the invention and to further illustrate the present invention, reference will now be made in the Examples below to the preferred embodiments, and specific language will be used to describe the same. It will nevertheless be understood that no limitation of the scope of the invention is thereby intended, such alterations and further modifications in the preferred embodiments of the invention, and such further applications of the principles of the invention as described therein being contemplated as would normally occur to one skilled in the art to which the invention relates.

GENERAL EXPERIMENTAL STUDY PROCEDURES

The subsequently described experimental studies designed to evaluate measures and agents for the prevention of dental calculus formation utilized a colony of 27 beagle dogs and 24 colony-bred domestic cats with a number of similar procedures. The animals were continuously housed in stainless steel cages or runs in an AAALAC-accredited facility in the Indiana University School of Dentistry. To establish the normal rate of calculus formation for each animal, they were administered a thorough dental prophylaxis (cleaning) to remove all existing calculus and other exogenous deposits (plaque, pellicle, debris) from all their teeth. The dogs were then provided with 150 g of a conventional Ralston Purina Company dry Dog Chow ® brand diet, which is a nutritionally balanced dog ration, that had been moistened with an equivalent amount of tap water approximately 30 minutes prior to each feeding. This feeding was provided twice daily throughout a 28-day test period. The cats were provided 50 g of a conventional Ralston Purina Company dry Cat Chow ® brand cat food diet that was not moistened prior to feeding. This feeding was similarly provided twice daily. Fresh tap water was provided twice daily to all animals. Since the rate of calculus formation is somewhat less in cats as compared to dogs, the test period for baseline data was 56 days.

At the conclusion of the test period the animals were anesthetized and buccal (cheek) surfaces of their posterior teeth were clinically examined for the presence of calculus using a grading system similar to the Volpe-Manhold index used in human clinical trials of anticalculus agents. For this examination, each tooth surface was assigned a numerical score of 0 to 4 based on the amount of tooth surface covered with calculus as follows: 0=none; 1=less than 10% coverage; 2=10 to 33% coverage; 3×between 33 and 66% coverage; and, 4=greater than 66% coverage. These individual tooth surface scores were then summated and divided by the number of tooth surfaces graded to obtain a mean tooth surface score for each animal.

The calculus scores obtained during the baseline/pretest period were considered to reflect the normal rate of calculus formation for each animal and were used to stratify the animals into groups for all subsequent tests. For example, for a planned 3-group test, the individual animal scores were ranked from the highest to lowest, stratified into blocks of 3 (i.e., the 3 highest scores comprised the first block, the next 3 highest scores comprised the second block, etc.), and then randomly assigned within blocks to each of the 3 groups (so-called randomized block procedure). Thus, each group was comprised of randomly-selected representative animals from each block. In some instances, depending upon the number of groups, a middle block was incomplete due to the number of animals available in the colony.

In all experimental studies, the clinical examinations were performed without knowledge of treatment groups by an examiner not otherwise involved in group assignment or daily feeding regimens. Further, the sequence of examinations was randomized to minimize systematic bias due to examiner fatigue, etc. Since the rates of dental calculus formation may change with increasing animal age, the foregoing procedures to establish normal calculus-formation rates were repeated at approximate annual intervals.

For each experiment, the dogs or cats were given a thorough dental prophylaxis immediately prior to initiation of the study. The animals were divided into the desired number of groups using the previously-described randomized block assignment procedure. The designated feeding regimens were provided twice daily, beginning with the evening feeding following the prophylaxis, for 28 consecutive days. Food consumption was monitored for each animal at each feeding to assure that experimental differences were not confounded by differences in food consumption. The animals were then anesthetized and examined for dental calculus formation as previously described. The data were subsequently analyzed using conventional biostatistical procedures, which routinely involved an analysis of variance (ANOVA) with the Newman-Keuls test procedure used to identify statistically significant ($p < 0.05$) intergroup differences. Between experiments the animals were maintained on a conventional Ralston Purina Company dry Dog Chow ® brand dog food or dry Cat Chow ® brand cat food regimen for a one-week (minimum) "washout" period to eliminate any possible carry-over effects from the previous test.

PREPARATION OF EXPERIMENTAL PET FOOD REGIMENS

For the first experimental study cited below, the experimental agents were added in the appropriate amount to Ralston Purina Company dry Dog Chow ® brand dog food as a component of the final coating procedure used commercially to enhance organoleptic properties. These test foods were prepared by Ralston Purina Company, an industrial manufacturer. For all the remaining dog studies, the experimental agents were applied as a coating to a commercially-available Ralston Purina Company dry Dog Chow ® brand dog food. For each feeding, the appropriate amount of the experimental agent was dissolved in a minimal quantity of deionized water and the solution was slowly poured over the designated amount, i.e., typically 125 g, of dry dog food with continual stirring to attempt to coat all the dog food with the agent. The placebo (control) regimens were similarly prepared except that no agent or other chemicals were added to the deionized water.

For the study conducted on cats and described below, a commercially-available Ralston Purina Company Purina, Beef & Liver Buffet ® brand canned (moist) cat food was utilized. The desired amount of the experimental agent in dry powder form was thoroughly mixed with the desired amount of canned cat food approximately 15–30 minutes prior to each feeding.

DESCRIPTION OF EXPERIMENTAL DOG STUDIES

Experimental Study #1

This experimental study was conducted to establish the comparative efficacy of a known crystal growth inhibiting anticalculus agent, soluble pyrophosphate, which was incorporated as an experimental component of the final coating procedure utilized in normal commercial manufacture of dry Dog Chow ® brand dog food. Soluble pyrophosphate was added as a mixture of tetrasodium pyrophosphate ($Na_4P_2O_7$) and sodium acid pyrophosphate ($Na_2H_2P_2O_7$) in amounts predetermined to provide 0.0, 0.5, 1.5, or 2.5% pyrophosphate ($P_2O_7$) in the final composition of the dog food. The test was designed as a 4-group study utilizing 3 cross-over legs to increase the statistical power by providing 20–21 dogs per regimen/group at completion. The results of this study are summarized in the following table:

| % $P_2O_7$ | N | Calculus Score* | Percent Reduction | Significant Difference** |
|---|---|---|---|---|
| 0.0 | 20 | 1.29 ± 0.17 | — | — |
| 0.5 | 21 | 1.17 ± 0.17 | 9.3 | No |
| 1.5 | 20 | 0.88 ± 0.19 | 31.8 | Yes*** |
| 2.5 | 20 | 0.64 ± 0.12 | 50.4 | Yes |

*Mean ± standard error of the mean
**Different from placebo ($p < 0.05$)
***Statistically significant using a one-tailed t test The results of this study indicate that while the addition of 0.5% soluble pyrophosphate to the coating of the dog food was without significant benefit, the similar use of the soluble pyrophosphate agent at concentrations of 1.5 and 2.5% resulted in reductions in calculus formation of 31.8 and 50.4%, respectively. These data thus serve to: (1) document the validity of this experimental model by confirming the anticalculus efficacy of a clinically-proven (in humans) agent; and, (2) provide comparative reference data to realistically position the efficacy of the preferred sequestering agent of the present invention, sodium hexametaphosphate.

Experimental Study #2

This experimental study was conducted to determine the efficacy of two anticalculus agents, sodium tripolyphosphate and sodium hexametaphosphate, in dogs. The agents were applied as an aqueous coating to dry Dog Chow ® brand dog food, as described previously. To permit a comparison with the results obtained in Experimental Study #1 using soluble pyrophosphate, the agents were incorporated in a manner to provide a phosphorus content equivalent to that provided by 1.5% pyrophosphate. This required using 2.12% sodium tripolyphosphate and 1.76% sodium hexametaphosphate. The results of this study are summarized in the following table:

| Agent Tested | Conc. (%) Agent | Conc. (%) $P_2O_7$ Equiv. | N | Calculus Score* | Percent Reduction | Significant Difference** |
|---|---|---|---|---|---|---|
| None (Placebo) | — | — | 9 | 1.27 ± 0.24 | — | — |
| Sodium Poly-Phosphate | 2.12 | 1.5 | 9 | 0.39 ± 0.12 | 69.3 | Yes |
| Sodium Hexa-metaphosphate | 1.76 | 1.5 | 9 | 0.22 ± 0.09 | 82.7 | Yes |

*Mean ± standard error of the mean
**Significantly different from placebo

The results of this study indicate that both agents, sodium tripolyphosphate and sodium hexametaphosphate, resulted in highly significant reductions in calculus formation of 69.3 and 82.7%, respectively. Although there was no significant difference between the two agents in terms of efficacy, the sodium hexametaphosphate was numerically more effective. Surprisingly, the sodium hexametaphosphate was more than 2.5 times more efficacious than the use of a comparable level of soluble pyrophosphate in the previous Experimental Study #1 (i.e., 82.7% reduction vs 31.8% reduction).

Experimental Study #3

This experimental study was designed to compare the efficacy of different concentrations of sodium hexametaphosphate added as an aqueous coating to dry Dog Chow ® brand dog food. The selected concentrations were chemically equivalent to those used in Experimental Study #1, evaluating soluble pyrophosphate. The actual concentrations of sodium hexametaphosphate added as a coating were 0.59, 1.76, and 2.93 (equivalent to 0.5, 1.5 and 2.5% pyrophosphate in terms of phosphorous content). The results of this study are summarized in the following table (HMP = sodium hexametaphosphate):

| Agent | Conc. (%) HMP | Conc. (%) $P_2O_7$ Equiv | N | Calculus Score* | Percent Reduction | Significant Difference** |
|---|---|---|---|---|---|---|
| None*** | 0.0 | 0.0 | 6 | 1.44 ± 0.31 | — | — |
| HMP | 0.59 | 0.5 | 7 | 0.65 ± 0.39 | 54.9 | Yes |
| HMP | 1.76 | 1.5 | 7 | 0.43 ± 0.11 | 70.1 | Yes |
| HMP | 2.93 | 2.5 | 7 | 0.15 ± 0.02 | 89.6 | Yes |

*Mean ± standard error of the mean
**Significantly different from placebo
***Placebo The foregoing results confirm the previously-observed efficacy of sodium hexametaphosphate for the prevention of dental calculus. Further, the efficacy was dosage dependent and improved with increasing concentrations of sodium hexametaphosphate in the coating with about 90% inhibition observed with the highest concentration of sodium hexametaphosphate tested (i.e., 2.93%). Quite surprisingly, and in contrast to previous observations in Experimental Study #1 with soluble pyrophosphate, a highly significant level of calculus prevention of 54.9% was obtained at the lowest concentration of sodium hexametaphosphate tested. As noted in Experimental Study #1, an equivalent concentration of soluble pyrophosphate failed to result in any significant benefit.

Experimental Study #4

The purpose of this experimental study was to compare the efficacy of equivalent concentrations of sodium hexametaphosphate and soluble pyrophosphate, applied to dry Dog Chow ® brand dog food using the same aqueous coating procedure, and provided to the same colony of dogs in the same test. Using the previously-described coating procedure, the dry dog food was coated with either an aqueous solution of tetrasodium pyrophosphate (1.63%) and sodium acid pyrophosphate (0.56%), which provided 1.5% soluble pyrophosphate, or, an aqueous solution of 1.76% sodium hexametaphosphate; the latter concentration of sodium hexametaphosphate provided a phosphorus concentration of 0.534%, which is equivalent to that provided by 1.5% soluble pyrophosphate ($P_2O_7$). The following table summarizes the results of this study (HMP=sodium hexametaphosphate):

| Agent Tested | Conc. (%) CPD. | P | N | Calculus Score* | Percent Reduction | Significant Difference** |
|---|---|---|---|---|---|---|
| None*** | — | — | 9 | 1.42 ± 0.23 | — | — |
| $P_2O_7$ | 1.50 | 0.53 | 9 | 0.75 ± 0.12 | 47.2 | Yes |
| HMP | 1.76 | 0.53 | 9 | 0.33 ± 0.17 | 76.8 | Yes**** |

*Mean ± standard of the mean
**Significantly different from placebo
***Placebo
****The difference between HMP and $P_2O_7$ is statistically significant (p < 0.05) using a one-tailed t test (t = 2.018)

These data indicate that the sodium hexametaphosphate-treated dog food reduced the formation of dental calculus by 76.8% while the similar use of soluble pyrophosphate decreased calculus formation by just 47.2%. Although both treatment agents significantly reduced dental calculus formation, the identical use of an equivalent amount of sodium hexametaphosphate resulted in a significantly greater level of protection than was obtained with soluble pyrophosphate. Thus, these findings confirm the surprising superiority of sodium hexametaphosphate for the prevention of dental calculus when used in the described manner in dogs.

DESCRIPTION OF EXPERIMENTAL STUDY IN CATS

Experimental Study #5

This experimental study was conducted to: (1) assess the ability of sodium hexametaphosphate to prevent dental calculus formation in domestic cats; and (2) determine the ability of sodium hexametaphosphate to provide such a benefit when added to a moistened (canned) cat food in contrast to the use of the agent as an aqueous coating on dry dog food as in the previous experimental studies. As described previously, the sodium hexametaphosphate was added as a fine powder to the moistened (canned) cat food in the experimental group while the non-sodium hexametaphosphate-treated moistened (canned) cat food was utilized as the placebo regimen. The results obtained in this study after 4 weeks are summarized in the following table (HMP=sodium hexametaphosphate):

| Agent Tested | Conc. (%) | N | Calculus Score* | Percent Reduction | Significant Difference |
|---|---|---|---|---|---|
| None | — | 12 | 0.69 ± 0.13 | — | — |
| HMP | 0.92*** | 12 | 0.39 ± 0.13 | 43.5 | Yes** |

*Mean ± standard error of the mean
**Difference from placebo using one-tailed t test was significant at the 0.06 level
***Provides equivalent P to 1.5% of $P_2O_7$ on basis of dry (solids) weight Previous studies in cats have shown that the magnitude of calculus reductions in cats after 4 weeks was not appreciably changed after test periods of 8 or 12 weeks.

These data indicate that sodium hexametaphosphate incorporated into a moistened (canned) cat food is also effective in preventing dental calculus formation in cats.

While the invention has been described in detail in the foregoing description and experimental studies, the same are to be considered as illustrative and not restrictive in character, it being understood that only the preferred embodiments to date have been described and that all changes and modifications that come within the spirit of the invention are desired to be protected.

What is claimed is:

1. In the method of preventing and/or reducing dental calculus buildup, deposits and/or formation on the teeth of dental calculus forming animals, the improvement comprising the step of contacting said teeth in said animals with a dry animal food having a surface coating that contains at least about 0.5% to about 3.0% by weight of the dry animal food of sodium hexametaphosphate, in a regular feeding regimen.

2. The method of claim 1 wherein said dry animal food is a nutritionally balanced dog ration.

3. The method of claim 1 wherein said dry animal food is a nutritionally balanced cat ration.

4. In the method of preventing and/or reducing dental calculus buildup, deposits and/or formation on the teeth of dogs, the improvement comprising the step of contacting said teeth in said dogs with a dry dog food having a surface coating that contains at least about 0.5% to about 3.0% by weight of the dry dog food of sodium hexametaphosphate, in a regular feeding regimen.

5. The method of claim 4 wherein said dry dog food is a nutritionally balanced dog ration.

6. In the method of preventing and/or reducing dental calculus buildup, deposits and/or formation on the teeth of cats, the improvement comprising the step of contacting said teeth in said cats with a dry cat food having a surface coating that contains at least about 0.5% to about 3.0% by weight of the dry cat food of sodium hexametaphosphate, in a regular feeding regimen.

7. The method of claim 6 wherein said dry cat food is a nutritionally balanced cat ration.

* * * * *

UNITED STATES PATENT AND TRADEMARK OFFICE
CERTIFICATE OF CORRECTION

PATENT NO. :     5,296,217

DATED      :     March 22, 1994

INVENTOR(S) :    George K. Stookey

It is certified that error appears in the above-identified patent and that said Letters Patent is hereby corrected as shown below:

In column 3, line 49, please change "3xbetween" to -- 3 = between --.

In column 8, line 3, in the heading of the table, please change "Significant Difference" to -- Significant Difference** --.

Signed and Sealed this

Eighth Day of November, 1994

Attest:

BRUCE LEHMAN

*Attesting Officer*     Commissioner of Patents and Trademarks